US012710737B2

(12) United States Patent
Wang et al.

(10) Patent No.: US 12,710,737 B2
(45) Date of Patent: Aug. 18, 2026

(54) VIBRATION DETERMINATION IN SUBSTRATE PROCESSING SYSTEMS

(71) Applicant: Applied Materials, Inc., Santa Clara, CA (US)

(72) Inventors: Zhi Wang, Redwood City, CA (US); Tao Zhang, San Ramon, CA (US); Punyabrahma Panda, Bangalore (IN); Michael Kutney, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 287 days.

(21) Appl. No.: 18/324,080

(22) Filed: May 25, 2023

(65) Prior Publication Data

US 2024/0393761 A1 Nov. 28, 2024

(51) Int. Cl.
*G05B 19/402* (2006.01)

(52) U.S. Cl.
CPC .. *G05B 19/402* (2013.01); *G05B 2219/37506* (2013.01); *G05B 2219/45032* (2013.01)

(58) Field of Classification Search
CPC ........ G05B 19/402; G05B 2219/37506; G05B 2219/45032
See application file for complete search history.

(56) References Cited

U.S. PATENT DOCUMENTS 5,566,092 A 10/1996 Wang et al.
5,980,194 A * 11/1999 Freerks .................. H01L 21/68 414/754
6,539,106 B1 * 3/2003 Gallarda ............. G06V 10/987 382/286
7,750,819 B2 7/2010 Lim
9,104,650 B2 8/2015 Hosek et al.
2003/0159515 A1 8/2003 Tonomura
2006/0110665 A1 5/2006 Bleeker et al.
2009/0249880 A1 * 10/2009 Lim ...................... G01M 7/025 73/659
2011/0160900 A1 * 6/2011 Morita ............. H01L 21/67276 700/228
2014/0156070 A1 * 6/2014 Merry .................... B25J 9/1653 700/253
2019/0204144 A1 * 7/2019 Oishi ..................... G01N 29/12
2019/0227097 A1 7/2019 Sadeghian Marnani et al.
2020/0103894 A1 4/2020 Cella et al.

FOREIGN PATENT DOCUMENTS

KR 101883885 B1 8/2018
KR 20190042780 A 4/2019

OTHER PUBLICATIONS

International Search Report and Written Opinion for International Application No. PCT/US2024/030872, mailed Sep. 9, 2024, 09 pages.

* cited by examiner

*Primary Examiner* — Kidest Worku
(74) *Attorney, Agent, or Firm* — Lowenstein Sandler LLP

(57) ABSTRACT

A method includes receiving, by a processing device, position error data from one or more motors of a process chamber. The method further includes performing preprocessing of the position error data. The method further includes transforming the position error data to a frequency domain. The method further includes determining, based on the frequency domain position error data, that a vibration fault has occurred in connection with the process chamber. The method further includes performing a corrective action in view of the vibration fault.

20 Claims, 7 Drawing Sheets

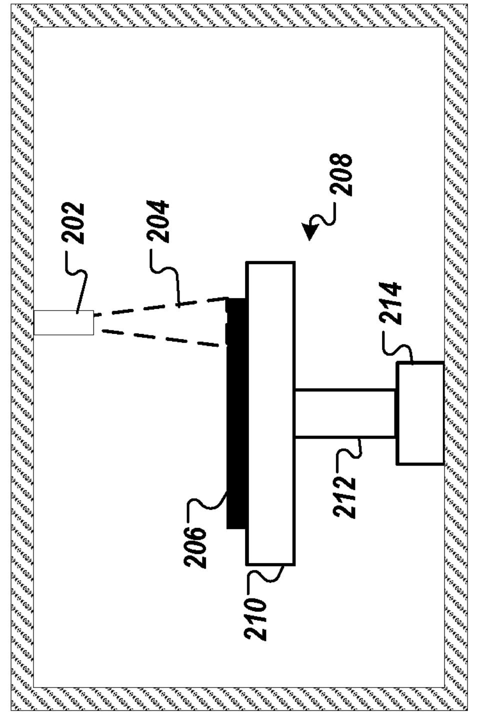
202
204
208
206
210
212
214
FIG. 2
200

VIBRATION DETERMINATION IN SUBSTRATE PROCESSING SYSTEMS

TECHNICAL FIELD

Embodiments of the present disclosure relate to determination of vibration. Specifically, embodiments of the present disclosure relate to determination of vibration of substrate processing systems.

BACKGROUND

Chambers are used in many types of processing systems. Examples of chambers include etch chambers, deposition chambers, anneal chambers, metrology chambers, and the like. Typically, a substrate, such as a semiconductor wafer, is placed on a substrate support within the chamber and operations are performed to advance processing of the substrate. Detailed understanding of processing conditions, the effect of conditions on a substrate, and evolutions of these parameters over time enables tight control of product properties. Measuring one or more properties of a substrate (e.g., performing metrology operations) may inform decisions or actions associated with updating or maintaining processing conditions of substrates. Measurement of a substrate and processing of a substrate may be sensitive to chamber conditions, including chamber vibration.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the present disclosure, a method includes receiving, by a processing device, position error data from one or more motors of a process chamber. The method further includes performing preprocessing of the position error data. The method further includes transforming the position error data to a frequency domain. The method further includes determining, based on the frequency domain position error data, that a vibration fault has occurred in connection with the process chamber. The method further includes performing a corrective action in view of the vibration fault.

In another aspect of the present disclosure, a non-transitory machine-readable storage medium stores instructions which, when execute, cause a processing device to perform operations. The operations include receiving position error data from one or more motors of a process chamber. The operations further include performing preprocessing of the position error data. The operations further include transforming the position error data to a frequency domain. The operations further include determining, based on the frequency domain position error data, that a vibration fault has occurred in connection with the process chamber. The operations further include performing a corrective action in view of the vibration fault.

In another aspect of the present disclosure, a system includes memory and a processing device coupled to the memory. The processing device is configured to receive position error data from one or more motors of a process chamber. The processing device is further configured to perform preprocessing of the position error data. The processing device is further configured to transform the position error data to a frequency domain. The processing device is further to determine, based on the frequency domain position error data, that a vibration fault has occurred in connection with the process chamber. The processing device is further to perform a corrective action in view of the vibration fault.

Numerous other features are provided in accordance with these and other aspects of the disclosure. Other features and aspects of the present disclosure will become more fully apparent from the following detailed description, the claims, and the accompanying drawings.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 2 depicts a metrology system of a substrate manufacturing system, according to some embodiments.

DETAILED DESCRIPTION OF EMBODIMENTS

Figure 1:
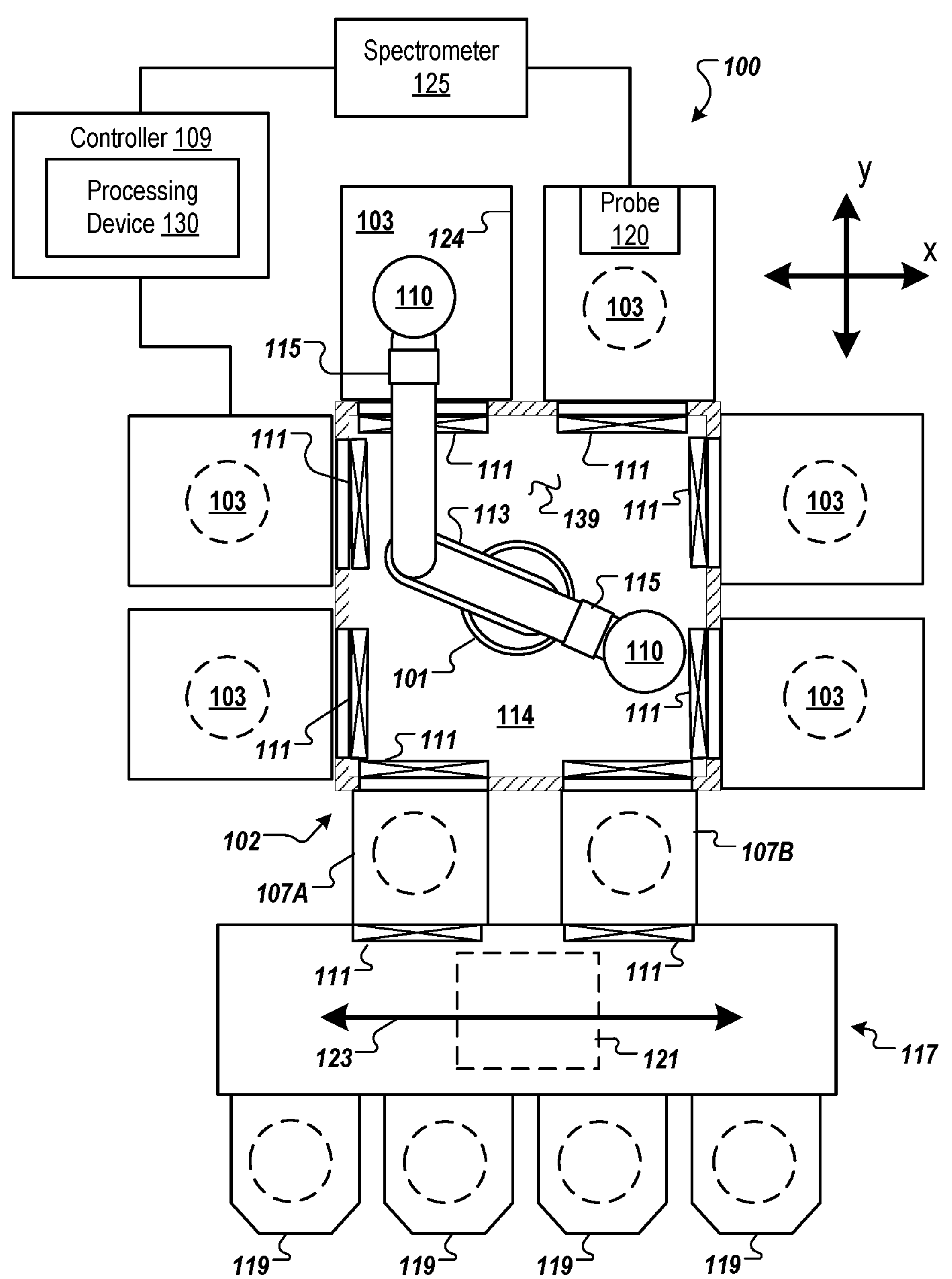
FIG. 1 is a top schematic view of an example processing system, according to some embodiments.

Described herein are methods, systems, devices, etc., related to performing measurements of a substrate processing system in a controlled environment. Methods, systems, and devices of the present disclosure may be utilized in determining vibration of a process chamber, load lock, aligner station, transfer chamber, factory interface, in-situ metrology device, ex-situ metrology device, and so on. The present disclosure may enable adjusting operations of a substrate manufacturing system in view of detected vibration. For example, methods, systems, and devices of the present disclosure may relate to performing metrology measurements of a substrate in vacuum, may relate to throughput-transparent metrology measurements for substrates in processing and/or before and/or after processing, may relate to measurements of a substrate in an environmentally-controlled chamber indicative of processing conditions associated with the substrate, etc.

Substrates are processed and/or manufactured in one or more processing chambers. Processing chambers may distinguish and separate the processing environment (e.g., the region of space in which substrates are processed) from ambient conditions. For example, substrate processing may be performed at a controlled gas pressure, under a controlled gas mixture, under vacuum, etc.

Substrates may be processed to fulfill target conditions, target performance metrics, target substrate properties, etc. Metrology may be performed during, before and/or after processing to determine whether substrates are achieving target performance thresholds. Actions may be taken based on metrology measurements, such as initiating maintenance, updating process recipes, aborting process procedures, modifying downstream process procedures, etc. Accuracy, resolution, and reliability of metrology techniques may have a great impact upon efficiency, agility, and certainty of actions taken in response to measured substrate properties.

In some systems, metrology measurements may be performed in a standalone metrology facility, e.g., separated from a process chamber. Standalone metrology measurements may benefit from increased accuracy, a larger available equipment footprint, less interference from a substrate processing system, more control in measurement by a user, etc., when compared to an integrated or in-line metrology system. In some systems, metrology measurements may be performed in a process chamber, in a process tool, under process (e.g., vacuum) conditions, in a process environment, etc. In some systems, metrology measurements may be performed in a metrology device that may be connected to or within a transfer chamber or factory interface to which chambers may also be connected. Chambers connected to a manufacturing system may include process chambers, deposition chambers, etch chambers, anneal chambers, metrology chambers, multi-use chambers, etc. Metrology techniques may assume, rely on, or be enhanced by a still environment, e.g., a vibration-free environment. Such an environment may be achieved in a standalone metrology facility, but may be difficult to achieve in a processing system for in in-line or integrated metrology system.

In some systems, in-line or integrated metrology system may suffer from interference by components of the processing system. For example, various pumps, motors, valves, actuators, etc., may introduce vibrations that may interfere with one or more measurements of substrate properties. Further, outside influence, such as objects colliding with a process system, influences of other process systems or other elements of a building housing the process system, etc., may induce motion that interferes with metrology measurements.

Aspects of the present disclosure may address one or more of the shortcoming of conventional systems. The present disclosure enables a method of monitoring and/or correcting for vibrations of a substrate manufacturing system. Aspects of the present disclosure may be utilized in connection with one or more metrology apparatuses. Aspects of the present disclosure may be utilized in connection with one or more components of a manufacturing system. Aspects of the present disclosure may be utilized with mechanical components of a manufacturing system.

Many manufacturing systems (e.g., substrate processing tools, substrate measurement tools, robots, etc.) include motors to move substrate support stages. For example, a stage may be utilized to support a substrate in an integrated metrology system, and to move various target locations of the substrate within a field of view of a measurement device. Stages may also move vertically and/or may include lift pins that move a substrate supported by the stage vertically, for handoff to or from a robot. Robots may further move substrates between chambers of a manufacturing tool, to various locations within chambers of the processing system, in and out of the manufacturing tool, etc.

Motors of a manufacturing system (e.g., stage motors) may include positional monitoring capabilities. For example, a motor may provide data indicating a positional difference between a set point position and a measured position, e.g., position error data. In some embodiments, a manufacturing system may utilize position error data to determine whether the manufacturing system is subjected to motion. A manufacturing system may utilize position error data to determine whether the system experiences vibration. A manufacturing system may utilize position error data to determine whether the system has experienced vibration during a substrate processing operation, during a substrate movement operation, during a measurement, metrology, or imaging operation, and so on. A manufacturing system may utilize position error data to determine an extent of vibration experienced during an operation. A manufacturing system may utilize position error data to determine an extent of vibration experienced during a metrology operation.

In some embodiments, a vibration monitoring module may receive position error data from one or more motors of a manufacturing system (e.g., for stages, robots, lift pins, slit valves, port, doors, and so on). The motors may be associated with stages for repositioning substrates, wafers, semiconductors, etc. The vibration monitoring module may further receive position reference data associated with the one or more motors. The position reference data may include position set points, motor pathing, stage positioning targets, etc.

In some embodiments, a vibration monitoring module may perform preprocessing on position error data. The module may perform preprocessing to remove artifacts from the position error data, e.g., remove erroneous signals generated by sources that are not of interest. For example, during stage motion, large and erratic position error data may be generated. Utilizing position reference data, portions of position error data associated with motor motion may be excluded from vibration analysis, may be corrected for stage motion, may be given less weight or provided with different threshold conditions, may be analyzed via different methods or with different analysis parameters, etc. In some embodiments, windows of time of the position error data that correspond to motion in the position reference data (e.g., slope of the position reference data is not zero) may be excluded from vibration analysis. In some embodiments, windows of time in the position error data for a target period after windows of time that correspond to motion may be excluded from vibration analysis (e.g., to account for motion settle).

In some embodiments, a transfer function may be utilized on the preprocessed position error data. In some embodiments, a transfer function may be utilized to express the position error data in a different domain. The transfer function may express the position error function in a frequency domain. The transfer function may be or include a Fourier transform.

In some embodiments, the transferred position error data (e.g., frequency-domain position error data) may be filtered. Filtering the data may include suppressing one or more frequency components. Filtering the data may include enhancing one or more frequency components. Filtering the data may include applying a filtering function to the frequency-domain position error data.

In some embodiments, a filter may be designed to relate position error data to system vibration. A filter may be designed by measuring vibration of a system and comparing position error data to the measured vibration. Designing a filter may include measuring equipment vibration via a separate measurement device, such as by securing one or more accelerometers to a manufacturing system. Designing a filter may include inducing vibration of a manufacturing system at a number of different frequencies, potentially corresponding to potential vibrations that may be experienced during substrate processing operations, substrate measurement or imaging operations, etc. Designing a filter may include designing a function that converts amplitude of measured vibration at the drive frequencies, as measured by position error data, to an amplitude measured by a separate vibration measurement tool, such as one or more accelerometers. A filter may approximate measured vibration when applied to motor position error data.

In some embodiments, filtered data may be utilized in making a fault judgment. A fault judgment may be a determination of whether vibration experienced by any component, device, chamber, etc. of the substrate manufacturing system is sufficient to interfere with one or more processes, measurements, etc. of the substrate manufacturing system. A fault judgment may include determining if vibration measured via position error data satisfies one or more threshold conditions. A fault judgment may include determining if amplitude of vibration satisfies a threshold condition, duration of vibration satisfies a threshold condition, or the like. A fault judgment may include determining if amplitude of vibration at a target frequency or target frequency range satisfies a threshold condition.

In some embodiments, a corrective action may be taken in view of the fault judgment. A corrective action may include flagging an operation of a processing system as potentially problematic. A corrective action may include flagging a measurement. A corrective action may include causing a measurement to be repeated. A corrective action may include adjusting operation of a mechanical component of the system. For example, one or more mechanical parts of the system which induce vibration may have operation altered, slowed, delayed, stopped, etc. A corrective action may include providing an alert to a user. A corrective action may include recommending maintenance, e.g., if vibration is detected that may be indicative of a failing component such as a pump, actuator, or the like.

Methods and systems of the present disclosure provide technical advantages over traditional systems. By measuring vibration of a manufacturing system utilizing position error data, a vibration measurement may be made without adding additional hardware to the manufacturing system. By measuring vibration of a manufacturing system and correlating a time of vibration to timing of one or more operations of the manufacturing system, faulty or unreliable operations may be avoided, repeated, or detected. By measuring vibration of a manufacturing system, costly actions taken in view of unreliable measurements may be avoided. By measuring vibration of a manufacturing system and correlating vibration to equipment components, the system may have warning about failing, drifting, or aging components. Monitoring aging of components of the manufacturing system may allow scheduled maintenance to occur, rather than costly unscheduled downtime, which may increase manufacturing system productivity and throughput, may decrease costs associated with unscheduled downtime such as repair time, re-seasoning time, express shipping for replacement components, etc. Adjusting operation of mechanical components of a manufacturing system in response to a vibration measurement may enable sensitive operations of the manufacturing system to proceed while the manufacturing system is performing other operations, increasing reliability of the sensitive operations, increasing throughput and productivity of the tool, etc.

In one aspect of the present disclosure, a method includes receiving, by a processing device, position error data from one or more motors of a chamber of a processing system. Chambers including motors may include metrology chambers, etch chambers, deposition chambers, anneal chambers, lithography chambers, etc. The method further includes performing preprocessing of the position error data. The method further includes transforming the position error data to a frequency domain. The method further includes determining, based on the frequency domain position error data, that a vibration fault has occurred in connection with the chamber of the processing system. The method further includes performing a corrective action in view of the vibration fault.

In another aspect of the present disclosure, a non-transitory machine-readable storage medium stores instructions which, when execute, cause a processing device to perform operations. The operations include receiving position error data from one or more motors of a chamber of a processing system. The operations further include performing preprocessing of the position error data. The operations further include transforming the position error data to a frequency domain. The operations further include determining, based on the frequency domain position error data, that a vibration fault has occurred in connection with the chamber of the processing system. The operations further include performing a corrective action in view of the vibration fault.

In another aspect of the present disclosure, a system includes memory and a processing device coupled to the memory. The processing device is configured to receive position error data from one or more motors of a chamber of a processing system. The processing device is further configured to perform preprocessing of the position error data. The processing device is further configured to transform the position error data to a frequency domain. The processing device is further to determine, based on the frequency domain position error data, that a vibration fault has occurred in connection with the chamber of the processing system. The processing device is further to perform a corrective action in view of the vibration fault.

FIG. 1 is a top schematic view of an example processing system 100, according to some embodiments. Processing system 100 may be a substrate processing system. Processing system 100 includes a substrate processing apparatus (e.g., substrate processing tool, physical components for substrate processing operations) and one or more computing devices (e.g., processing devices). Processing system 100 includes a transfer chamber robot 101 and a factory interface robot 121 each adapted to pick and place substrates 110 (sometimes referred to as "wafers" or "semiconductor wafers") from or to a destination in an electronic device processing system such as the processing system 100 illustrated in FIG. 1. However, any type of electronic device substrate, mask, or other silica-containing substrate (generally referred to as "substrates" herein) may be conveyed and transferred by the disclosed robots. For example, the destination for the substrates 110 may be one or more chambers 103 and/or one or more of the load lock apparatus 107A, 107B that may be distributed about and coupled to a transfer chamber 114. As shown, substrate transfers may be through slit valves 111, for example. Chambers 103 may include process chambers, metrology chambers, lithography chambers, etc.

Processing system 100 may further include a mainframe 102 including the transfer chamber 114 and a number of chambers 103. A housing of the mainframe 102 includes the transfer chamber 114 therein. The transfer chamber 114 may include top wall (not shown), bottom wall (floor) 139, and side walls, and may include a controlled environment. The controlled environment may include vacuum conditions, a controlled pressure (e.g., different from ambient atmospheric pressure), a controlled gas environment (e.g., inert gas such as argon or nitrogen gas or a gas mix), or the like. In the depicted embodiment, the transfer chamber robot 101 is mounted to the bottom wall (floor) 139. However, the transfer chamber robot 101 could be mounted elsewhere, such as to the top wall.

In various embodiments, chambers 103 may be adapted to carry out any number of processes on substrates 110. The processes may include deposition, oxidation, nitration, etching, polishing, cleaning, lithography, metrology (e.g., integrated metrology), or the like. Other processes may be carried out as well. The load lock apparatus 107A, 107B may be adapted to interface with a factory interface 117 or other system component, that may receive substrates 110 from substrate carriers 119 (e.g., Front Opening Unified Pods (FOUPs)) that may be docked at load ports of the factory interface 117, for example. The factory interface robot 121 (shown dotted) may be used to transfer the substrates 110 between the substrate carriers 119 and each load lock apparatus 107A, 107B. Transfers of the substrates 110 may be carried out in any sequence or direction. The factory interface robot 121 may be identical (or similar) to the transfer chamber robot 101 in some embodiments, but may further include a mechanism to allow the factory interface robot to move in either lateral direction and indicated by arrow 123. Any other suitable robot may be used as the factory interface robot 121. In some embodiments, system 100 may be coupled to (e.g., interface with) a metrology system, e.g., an integrated metrology system, an inline metrology system, etc.

Processing system 100 can include an integrated measurement and/or imaging system. An integrated measurement or imaging system may be, for example, a reflectometry (IR) system. Reflectometry is a measurement technique that uses measured changes in light reflected from an object to determine geometric and/or material properties of the object. Reflectance spectrometers measure the intensity of reflected light across a range of wavelengths. For dielectric films these intensity variations may be used to determine the thickness of the film. Additionally, reflectometry measurements may be used to detect CD, CD-bias, and other physical parameters related to a substrate processing outcome.

An integrated measurement and/or imaging system may be connected to factory interface 117. Alternatively, a measurement and/or imaging system may be connected to transfer chamber (e.g., at a location of one of the illustrated chambers 103). Alternatively, the measurement and/or imaging system may be positioned in an interior of the factory interface 117 or transfer chamber 114. A measurement and/or imaging system may also be a standalone system that is not connected to processing system 100. A measurement and/or imaging system may be mechanically isolated from factory interface 117 and from an external environment to protect the measurement and/or imaging system from external vibrations. In some embodiments, the measurement and/or imaging system and its contained components may provide analytical measurements (e.g., thickness measurements) that may provide a profile across a surface of a substrate, such as a thickness uniformity profile, a particle count profile, a CD profile, a CD uniformity profile, an optical constant profile, a material property profile, and so on. The measurement and/or imaging system may provide feedback to a user regarding the uniformity profile. The measurement and/or imaging system may be an assembly that has the ability to measure film thicknesses, CD, CD-bias, optical properties, particle count, material properties, surface roughness, etc. across the entire substrate after it is processed in a chamber. Such metrology may be used to monitor process drift, out-of-specification film thickness, out-of-specification CD, CD-bias, etc. for etch, deposition, and/or other processes. The results of the measurement may be used to quickly correct or adjust process parameters of one or more process recipes executed on one or more process chambers to account for any determined process drift. Additionally, the results of the measurements may be used to determine when to perform maintenance on a process chamber, when to perform further testing on a substrate, when to flag a substrate as being out-of-specification, and so on. In some embodiments, one or more motors of an integrated measurement system may be utilized in making a vibration determination based on position error data of the one or more motors.

In embodiments, and by way of exemplified explanation for any robot, the transfer chamber robot 101 includes at least one arm 113 (e.g., a robot arm) and at least one end effector 115 coupled to the arm 113. The end effector 115 is controllable by the transfer chamber robot 101 in order to pick up a substrate 110 from a load lock apparatus 107A or 107B, guide the substrate 110 through one of the slit valves 111 of a chamber 103, and accurately place the substrate 110 onto a substrate support of the chamber 103. In some embodiments, end effector 115 may include a blade for supporting substrate 110. In some embodiments, end effector 115 may support a first portion of substrate 110, e.g., may be ring-shaped enabling some portion of substrate 110 to be visible from the bottom while substrate 110 is supported by end effector 115.

Any substrate transfer system (e.g., robot) may include one or more motors for moving at least a portion of the transfer system. For example, a motor may be utilized to extend one or more arms for transferring substrates in and out of various process chambers, metrology chambers, load lock chambers, or the like. A motor may be utilized to enable factory interface robot 121 to travel linearly between various substrate carriers 119.

In some embodiments, further robots may be present within one or more of the chambers 103. For example, a chamber including one or more metrology apparatuses may include a stage for moving a substrate within the metrology apparatuses. The stage may be utilized for adjusting a portion of a substrate that is within a field of view of a metrology apparatus. In some embodiments, one or more motors may be associated with the stage. One or more motor associated with the stage may be linear motors. For example, a metrology system may include a stage with one linear motor for generating linear motion of the substrate and one rotational motor for generating rotational motion of the substrate.

In some embodiments, a motor may be provided with target position data. The target position data may in associated with an intended path of a substrate, an intended path of a substrate support or stage, an intended path of a robot, etc. In some embodiments, the motor may provide position reference data related to a target path of the motor. In some embodiments, the position reference data may be derived from or may be the same as the target position data. The motor may provide position error data. The position error data may be related to a difference between a target motor position and an actual motor position. The position error data may be a time trace demonstrating a difference between an intended path of motor positions and a measured path of motor positions. In some embodiments, position error data provided by a motor may be utilized in determining vibration experienced by the chamber.

In various embodiments, one or more of the chambers 103 may include a probe 120 (e.g., a device for collecting electromagnetic radiation), at least a part of which is within a chamber of processing system 100. In some embodiments, probe 120 may be within a chamber 103 (as shown). In some embodiments, probe 120 may be within transfer chamber 114. In some embodiments, probe 120 may be within a slit valve assembly that includes slit valve 111. In some embodiments, probe 120 may be within a load lock 107A-B. In some embodiments, probe 120 may be within factory interface 117. In some embodiments, probe 120 may include optical components designed to couple radiation collected from within a chamber of processing system 100 and couple that radiation into one or more fiber optic cables/cores. In some embodiments, probe 120 may be disposed above a path of a substrate (e.g., may be suspended from or embedded in a top wall of processing system 100). In some embodiments, probe 120 may be disposed below a path of a substrate. In some embodiments, multiple probes may be included in a processing system 100, chamber 103, transfer chamber 114, etc.

In some embodiments, a field of view of the probe (e.g., a spatial region from which the probe is configured to receive electromagnetic radiation) may intersect with a path of substrate 110, a path of end effector 115, may be proximate to a coupling between chambers (e.g., proximate to slit valve 111), etc. In some embodiments, probe 120 may be configured to receive radiation reflected from a surface of the substrate. In some embodiments, probe 120 is configured to receive radiation transmitted through the substrate. In some embodiments, probe 120 is configured to receive radiation emitted by the substrate. In some embodiments, probe 120 may include an array of devices, e.g., devices with different (overlapping, non-overlapping, or the like) fields of view, devices with different functions (e.g., devices that receive radiation of different portions of the electromagnetic spectrum, devices that are configured to receive reflected, emitted, or transmitted light, etc.

In some embodiments, probe 120 may be configured to receive radiation from substrate 110 while substrate 110 is supported by a motorized stage, support, or the like. Probe 120 may be configured to make measurements of the substrate while the substrate is at rest, e.g., probe 120 may be configured to receive radiation from substrate 110 between motions of one or more motors of the motorized stage. Data generated by probe 120 may be impacted by unintended motion or vibration of substrate 110. For example, vibration of processing system 100 may cause measurements of probe 120 to be inaccurate, unreliable, not useful, or the like.

In some embodiments, probe 120 may be configured to receive radiation from substrate 110 while substrate 110 is being transferred from a first portion of processing system 100 to a second portion of processing system 100. For example, probe 120 may be disposed such that a field of view of probe 120 may intersect with a path through which transfer arm 113 may transmit substrate 110. Probe 120 may receive radiation from substrate 110 while substrate 110 is being transferred from transfer chamber 114 to chamber 103. Probe 120 may receive radiation from substrate 110 while substrate 110 is being transferred from chamber 103 to transfer chamber 114.

In some embodiments, radiation or light received by probe 120 may be directed to a spectrometer 125 for analysis. Light received by probe 120 may be focused into a fiber optic cable that is coupled to a spectrometer 125 for analysis, e.g., spectral analysis. Spectrometer 125 may perform operations (e.g., spectrometer 125 may include or be coupled to a processing device) to determine one or more spectra of the light that may be used to determine at least one property of the substrate. In some embodiments, radiation/light will be received from the substrate before substrate processing. In some embodiments, light will be received from the substrate after substrate processing. In some embodiments, light will be received from the substrate between processing operations. The probe 120 and the spectrometer 125 may comprise an optical sensor associated with the chamber 103, with the transfer chamber 114, with processing system 100, etc. Probe 120 and the spectrometer 125 may comprise a metrology system to be operated in a controlled environment. Probe 120 and spectrometer 125 may comprise an in-vacuum metrology system. The optical sensor may detect at least one property of a material of substrate 110. In some embodiments, by way of a thin-film optical calculation by a processing device (e.g., processing device 130), the optical sensor may provide sensor data indicative of the thickness of a material of substrate 110. For example, the optical sensor may be used to determine a thickness of the latest film applied to substrate 110, the latest film exposed (e.g., after an etch operation) of substrate 110, etc. The optical sensor may be used to determine a total thickness of the substrate. The optical sensor may be used to determine additional characteristics of the substrate. The optical sensor may be used to determine a geometry of the substrate (e.g., a measurement of one or more dimensions of the substrate). The optical sensor may be used to determine a chemical or physical composition of the substrate or a portion of the substrate. The optical sensor may be used to classify, analyze, and/or characterize a pattern of a patterned substrate.

In some embodiments, processing system 100 may further include a source of electromagnetic radiation, e.g., that is optically coupled to probe 120 (e.g., probe 120 is configured to receive radiation generated by the source). In some embodiments, light received by probe 120 may be reflected from substrate 110. In some embodiments, radiation may be provided to substrate 110 from a location near probe 120, from a fiber core bundled with a fiber cord of probe 120, from the same side of substrate 110 (e.g., top side, bottom side, etc.) as probe 120, etc. Radiation may be provided to substrate 110 by a radiation coupling device that is embedded in a wall of the chamber, supported by a bottom wall of the chamber (e.g., bottom wall 139), suspended from a top wall of the chamber, etc. Light received by probe 120 may be transmitted through substrate 110. Radiation may be provided to substrate 110 from a location disposed opposite (e.g., with respect to substrate 110) from probe 120. For example, probe 120 may be suspended from and/or near a top wall of processing system 100, and radiation may be provided from near the bottom wall 139. In some embodiments, the system may include multiple probes, may include one or more arrays of probes, may include probes disposed above and/or below the substrate, etc.

A controller 109 (e.g., a tool and equipment controller) may control various aspects of the processing system 100, e.g., gas pressure in the chamber 103, individual gas flows, spatial flow ratios, temperature of various chamber components, and radio frequency (RF) or electrical state of the chamber 103. Controller 109 may receive signals from and send commands to the factory interface robot 121, the transfer chamber robot 101, one or more sensors, and/or other processing components of processing system 100. Controller 109 may thus control the initiation and cessation of processing, may adjust a deposition rate, type or mix of deposition composition, and the like. The controller 109 may further receive and process sensing data from various sensors, e.g., sensors associated with processing system 100, sensors of various motors generating position error data, etc.

Processing device 130 may perform various operations for vibration detection and/or estimation. Processing device 130 may perform vibration detection operations based on data received from one or more motors of processing system 100. Processing device 130 may perform vibration detection operations based on position error data received from one or more motors. Processing device 130 may perform vibration detection operations based on data received from one or more linear motors.

Controller 109 and/or processing device 130 may be and/or include a computing device such as a personal computer, a server computer, a programmable logic controller (PLC), a microcontroller, and so on. The controller 109 and/or the processing device 130 may include (or be) one or more processing devices, which may be general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. Controller 109 and/or processing device 130 may include a data storage device (e.g., one or more disk drives and/or solid state drives), a main memory, a static memory, a network interface, and/or other components. Processing device 130 may execute instructions to perform any one or more of the methodologies and/or embodiments described herein. The instructions may be stored on a computer readable storage medium, which may include the main memory, static memory, secondary storage and/or processing device (during execution of the instructions).

FIG. 2 depicts a metrology system 200 of a substrate manufacturing system, according to some embodiments. Metrology system 200 may be included in a chamber of a processing system, such as one of the chambers 103 of FIG. 1. Metrology system 200 includes metrology device 202. The metrology device 202 may be or include a probe for measuring or monitoring one or more properties of substrate 206. Metrology device 202 may be associated with a field of view 204. Metrology device 202 may include one or more sensors of electromagnetic radiation. Metrology device 202 may include one or more of optical sensors, IR sensors, etc. Metrology device 202 may measure one or more properties of a substrate 206. Metrology device 202 may include a device for measuring substrate thickness, optical properties, material properties, electrical properties, etc. Metrology device 202 may include a reflectometry device. Metrology device 202 may be or include an interferometer device. Metrology device 202 may further be coupled to a spectrometer, an analyzer, a computer or processing device, etc.

Metrology device 202 may be any device that benefits from a still, static, or vibration free environment, such as a tool for measuring the placement of a substrate, etc. One or more measurement operations may be impacted by vibration of substrate 206 relative to metrology device 202. For example, measurements may be taken by averaging a signal received by metrology device 202 over some duration of time. Motion of the substrate within that duration may cause metrology device 202 to generate data that is less accurate, less reliable, less applicable, or the like, than if the system remained still, without vibration of substrate 206. Vibration may be caused by components of the manufacturing system (e.g., moving parts of the system causing vibration), components associated with the manufacturing system (e.g., off-tool pumps, motors, or other parts), outside interferences (e.g., a user bumping into a tool), or the like.

Metrology system 200 further includes substrate support 208. Substrate support 208 may include stage 210 and pedestal 212. Substrate support 208 may include a device for holding a substrate, such as a vacuum chuck, electrostatic chuck, mechanical chuck, magnetic chuck, or the like. Substrate support 208 may include a plate or other surface with a substrate-shaped pocket or a set of pins surrounding a substrate placement zone for securing a substrate position on the substrate support 208. Metrology system 200 further includes stage motor 214. Stage motor 214 is utilized in repositioning substrate 206. Stage motor 214 may be coupled to (e.g., travel with) substrate support 208, stage motor 214 may remain stationary and drive substrate support 208, etc.

In some embodiments, substrate support 208 may be configured to be moved in multiple dimensions. Substrate support 208 may include a number of stage motors (e.g., actuators) that are configured to move substrate support 208. Through this disclosure, the word "motor" is used for describing means for performing substrate relocation, though methods of the disclosure may be applicable to other means of relocating a substrate. Substrate support 208 may adjust a position of substrate 206 in order to bring a target portion of substrate 206 into field of view 204 of metrology device 202. Substrate support 208 may adjust a position of substrate 206 in order to make measurements at multiple locations of substrate 206, e.g., spread around the surface of substrate 206. In some embodiments, each motor may be configured to generate one dimension of motion. For example, a first motor may generate motion of substrate support 208 in an "x" dimension, and a second motor may generate motion of the substrate support 208 in a "y" dimension. In another example, a first motor may generate motion of substrate support 208 in a first linear dimension, and a second motor may generate rotation motion of substrate support 208. A first actuator may be a linear actuator, and a second actuator may be a rotational actuator.

Stage motor 214 may receive target position data. Target position data may be received from the substrate processing system, a control system, etc. Target position data may indicate position set points, a position path, etc., for stage motor 214. Target position data may indicate an intended path for substrate support 208 to travel. Target position data may indicate an intended path for taking measurements of a number of locations of substrate 206. Stage motor 214 may generate position error data. Stage motor 214 may provide position error data, e.g., to a processing device or control system. Position error data may indicate a difference between target position data and measured motor position data, measured stage position data, etc. Stage motor 214 may provide measured position data, and a processing device may determine position error data based on measured position data and target position data. Vibration that metrology system 200 is exposed to may be reflected in position error data. Vibration may be observed as oscillation in position error data.

Position error data may be utilized in identifying vibration of metrology system 200, characterizing vibration of metrology system 200, measuring vibration of metrology system 200, etc. In some embodiments, a system other than a metrology system may be sensitive to vibration. A system other than a metrology system may utilize motor position error data to identify and/or characterize vibration of a manufacturing system, process tool, or the like. Methods for utilizing position error data are discussed in connection with FIGS. 5A-B.

In some embodiments, a vibration monitoring system may be calibrated. Calibrating a vibration monitoring system may include relating vibration of the substrate processing tool to oscillations in position error data. Calibration of the vibration monitoring system may include utilizing a vibration monitoring device for a calibration procedure, such as one or more accelerometers. Calibration of the vibration monitoring system may include driving vibration of the metrology system 200, e.g., by an external vibration-inducing device. Calibration of the vibration monitoring system may include comparing response of a vibration monitoring device (e.g., accelerometer) to position error data at a various frequencies of interest, at various drive frequencies, etc. For calibration procedures, a vibration monitoring device may be affixed to one or more components proximate the location of a substrate during operations of the substrate manufacturing system. For example, accelerometers may be disposed on substrate support 208, proximate metrology device 202, or the like. Calibration of a vibration monitoring system is discussed in connection with FIG. 4.

Metrology system 200 may be included in a metrology chamber. Metrology system 200 may be part of a metrology chamber that is coupled to a substrate processing tool. Metrology system 200 may be part of an integrated metrology system. Metrology system 200 may be part of a chamber that is not a dedicated metrology chamber, e.g., a transfer chamber, a process chamber, etc. Metrology system 200 may be part of an in-line metrology system. Position error data may be used in assisting metrology operations of metrology system 200. Position error data may be used in performing and/or recommending corrective actions in association with the metrology system 200.

Position error data may be used in performing and/or recommending corrective actions in association with the manufacturing system. Position error data may be used in determining whether a metrology measurement is reliable based on chamber vibration. Position error data may be utilized in flagging measurements as unreliable, faulty, etc. Position error data may be utilized in determining whether there is value in repeating a measurement that may be unreliable due to vibration. Position error data may be utilized in adjusting operation of one or more components that may be causing chamber vibration, such as pumps, motors, actuators, etc. Mechanical components causing vibration may be slowed, shut off, have timing or operations adjusted to reduce vibrations, etc. Position error data may be utilized in recommending maintenance, e.g., of one or more components that may be causing vibrations. For example, pumps, actuators, valves, motors, or the like may generate additional vibrations as they age, become damaged, begin failing, or the like. By mitigating negative effects of vibrations of aging components, service lifetimes of mechanical components may be extended, as a need to replace components initiating vibration may be mitigated by vibration monitoring systems. Position error data may be utilized in providing one or more alerts to a user regarding vibrational conditions of the substrate processing system.

Figure 3:
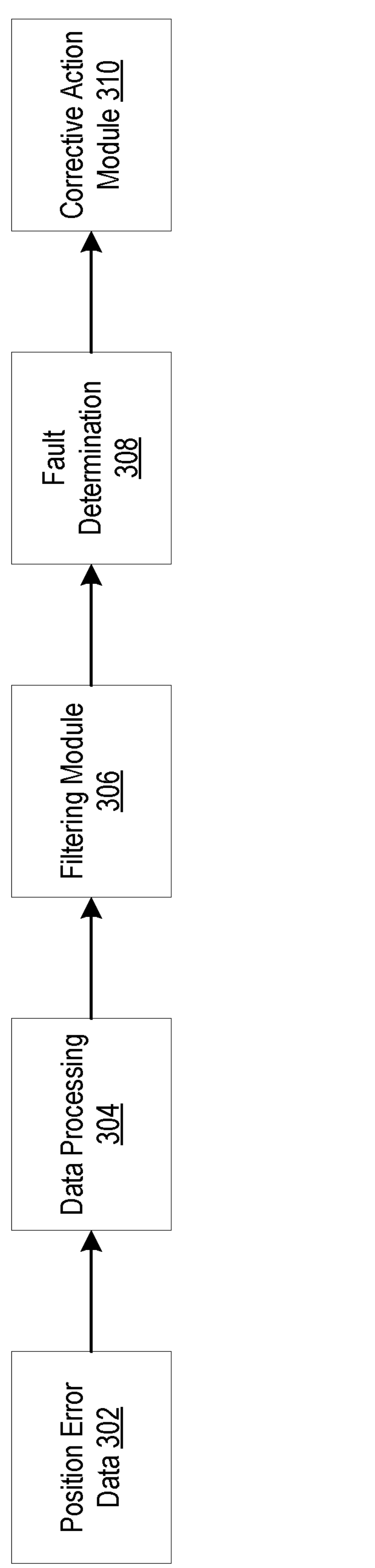
FIG. 3 is a block diagram depicting data flow for performing a corrective action based on a vibration determination, according to some embodiments.

FIG. 3 is a block diagram depicting data flow 300 for performing a corrective action based on a vibration determination, according to some embodiments. Flow 300 begins with position error data 302. Position error data 302 may be associated with a motor of a substrate processing tool. Position error data 302 may be associated with a motor of a substrate stage for positioning a substrate within the substrate processing tool. Position error data 302 may be associated with a linear motor of the substrate processing tool. Position error data 302 may be based on a difference between an intended position of a motor of the substrate processing tool and a measured position of the motor. Position error data 302 may be calculated by a processing device, e.g., upon receiving position data from a motor. Position error data 302 may be provided by a motor.

Position error data 302 is provided to a module for data processing 304. Data processing 304 may include operations for adjusting position error data for vibration determination, e.g., vibration detection, vibration characterization, vibration measurement, etc. Data processing 304 may include operations for adjusting position error time trace data. Data processing 304 may include operations for excluding portions of position error data that may not be useful for vibration determination.

Data processing 304 may include excluding some portions of position error data. Position error data may be or include time trace data indicative of a difference between a target motor position and a measured motor position. The target motor position may be represented by position reference data. At some windows of time, a motor may be moving, which may be reflected in the target motor position data. For example, a slope of target motor position data may be different than zero, which may indicate instructions for the motor to be moving a stage supporting a substrate. Portions of position error data corresponding to the motor moving may not be indicative of vibration of the tool or chamber. For example, portions of position error data associated with times while the motor is moving may be interfered with by the motor motion, and may not be clearly related to external tool vibration.

One or more time windows of position error data may be excluded or weighted to be of less importance based on target motor position data. A time window while a motor is moving (e.g., time window that has a slope of the target motor position data different than zero) may be excluded from vibration analysis of position error data. Additional time windows of position error data may further be excluded from vibration analysis. For example, a period before motor motion may be excluded, e.g., to account for time mismatches. A period after motor motion may be excluded, e.g., to allow time for motor settle. A time period before and/or after motor motion may be selected based on motor characteristics, tool or chamber characteristics, intended operations of the chamber including the motor, or the like. For example, a shorter settle time may be selected for shorter motor travel. A shorter settle time may be selected for procedures where the motor moves many times repeatedly, e.g., to avoid excluding too large a portion of the position error data for meaningful results to be generated.

Data processing 304 may include application of one or more transfer functions to position error data, e.g., position error data with portions associated with motor motion excluded. The one or more transfer functions may transition a time-domain signal to a frequency-domain signal. The transfer functions may include one or more Fourier transform algorithms.

Processed data is provided to filtering module 306. Filtering module 306 may perform a number of operations directed toward adjusting position error data to more closely predict external chamber vibration. Filtering module 306 may act on frequency domain data to improve predictive power of the data. Filtering module 306 may apply a frequency domain filter to improve predictive power of the data. Filtering module 306 may apply one or more frequency domain filters. Filtering module 306 may apply a frequency domain filter designed for use in vibration determination. Design of one or more filters for use in filtering module 306 may include calibration operations to relate one or more vibration amplitudes experienced by a tool or chamber to vibration amplitudes measured via position error data. Application of a filter to frequency domain position error data may approximate measure vibration of a substrate processing apparatus. Design of a frequency domain filter is discussed in connection with FIG. 4.

Filtered data is provided to fault determination module 308. Fault determination module 308 may determine whether a vibration measured by a motor position error system may be sufficient to disturb a process of a manufacturing system. Fault determination module 308 may determine whether vibration may disturb a process based on an amplitude of vibration, one or more amplitudes at various frequencies, or the like. Fault determination module 308 may determine vibrational disturbance based on whether a vibration satisfies a threshold condition, e.g., whether one or more amplitudes of vibration meet a threshold value.

Data from fault determination module 308 is provided to corrective action module 310. Corrective action module 310 may recommend one or more corrective actions based on data received from fault determination module 308. Corrective action module 310 may perform one or more corrective actions based on data received from fault determination module 308.

Corrective actions associated with corrective action module 310 may include flagging a measurement performed. Flagging the measurement may include providing metadata that indicates the measurement is unreliable. Flagging the measurement may be performed in situations where vibration occurs during a metrology measurement that may interfere with the measurement. Flagging the measurement may be performed in situations where an optical, infrared, or other radiation detection measurement is performed. Flagging the measurement may be performed in situations where a position of the substrate is measured, such as a notch detection operation.

Corrective actions associated with corrective action module 310 may include causing a measurement to be repeated. For example, a metrology measurement performed in a vibrating chamber may be repeated soon after it is performed. A metrology measurement may be repeated to improve reliability of a measurement taken during vibration of the chamber.

Corrective actions may include adjusting operation of a mechanical component of a substrate processing system. For example, a pump, actuator, or other moving part may be causing vibration of the chamber that may interfere with an operation performed in the chamber. Operation of the mechanical component may be adjusted, slowed, stopped, or the like, to enable an operation to be performed in the chamber more reliably.

Corrective actions may include recommending maintenance. Mechanical components of a manufacturing system such as pumps may induce vibration as they age or fail. A vibration signature based on position error data of a motor may be utilized in recommending maintenance on one or more components of a substrate processing system Corrective actions may include providing one or more alerts to a user. Alerts may include indications associated with corrective actions, processing tool drift, aging, or failure, component drift, aging, or failure, external sources of vibration to be addressed, statistics of historical vibration, etc.

Figure 4:
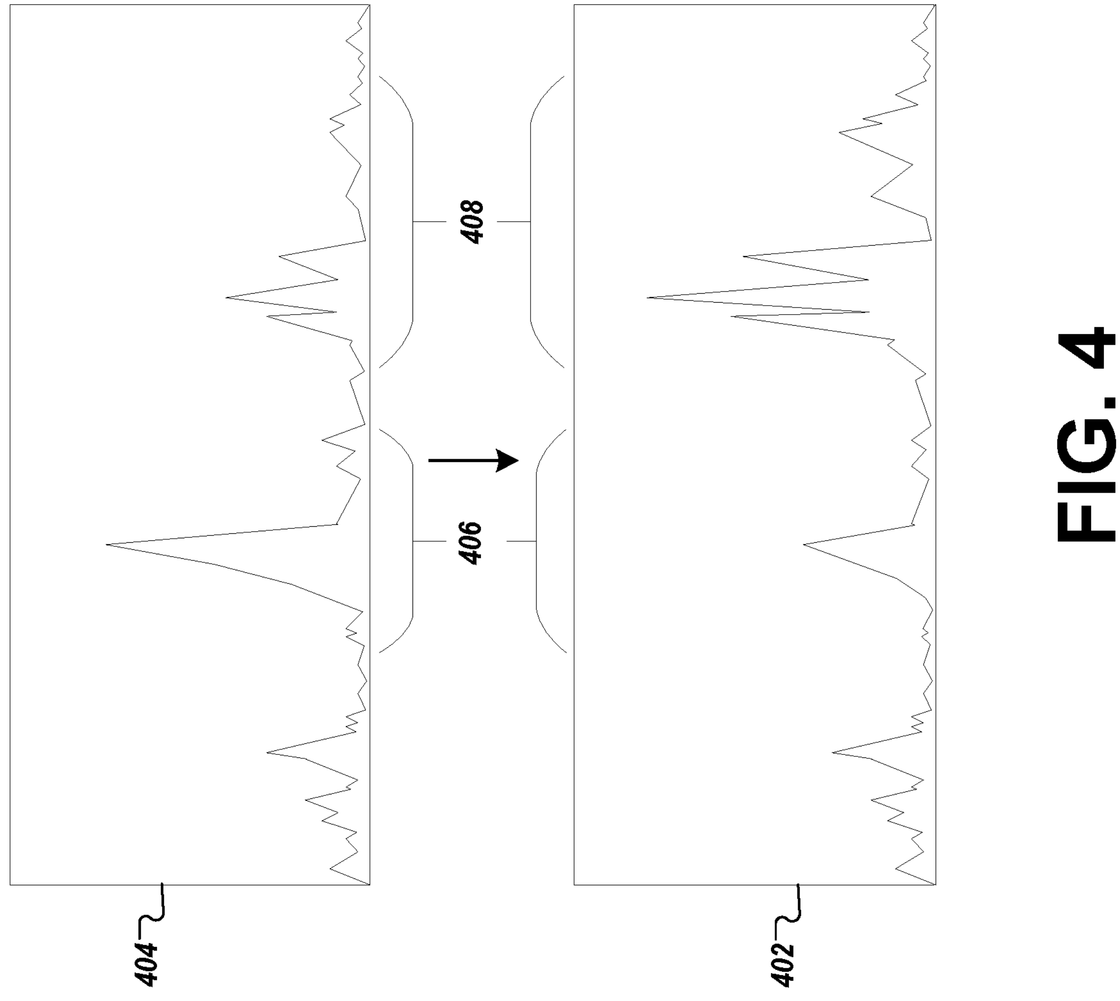
FIG. 4 depicts effects of an example filtering procedure for generating a filtered representation from transformed position error data, according to some embodiments.

FIG. 4 depicts effects of an example filtering procedure for generating a filtered representation 402 from transformed position error data 404, according to some embodiments. Transformed position error data 404 may be represented in a frequency domain, e.g., a frequency of oscillation detected in position error data of a motor. Transformed position error data 404 may include amplitudes of various frequency components included in the time trace position error data.

Chamber vibration may be related to position error data. In some embodiments, calibration operations may be performed to determine relationships between frequency components of position error data and frequency components of chamber vibration. Calibration operations may include performing measurements of chamber vibration, e.g., by affixing one or more accelerometers to components of the chamber. Accelerometer data may be time trace data. Accelerometer data may be time trace data associated with vibration of a chamber of a processing system. Accelerometer data may be transformed to frequency space, e.g., for determining an amplitude of vibration at a number of frequency components.

Calibration operations may include generating chamber vibration. For example, chamber vibration may be driven at a number of frequencies. Driving vibration for calibration may improve an understanding of a relationship between position error data and vibration (e.g., as measured by one or more accelerometers).

A filter may be designed for adjusting vibration data based on position error data to more closely reflect actual chamber vibration, as measured by other means (e.g., accelerometer data, driven accelerometer data, etc.). One or more portions (e.g., frequency components) of position error data may be suppressed compared to measured vibration data. One or more portions of position error data may be accentuated compared to measured vibration data. A filter may be designed to adjust frequency components based on position error data to increase a similarity with measured vibration. A filter may suppress over-represented frequencies (e.g., reduce an amplitude of frequencies of the transformed position error data that are larger than corresponding intensities of measured vibration data). A filter may increase an amplitude of frequencies that have less amplitude in transformed position error data than corresponding measured vibration data. In some embodiments, trace data may be normalized or otherwise processed to improve consistency of filtering.

Transformed position error data 404 and filtered representation 402 include first portion 406 and second portion 408. Transformed position error data may have different relative amplitude profile than measured vibration data (e.g., measured by one or more accelerometers). For example, transformed position error data 404 may have more amplitude in frequency components of first portion 406 than measured vibration (relative to other frequency components). Transformed position error data 404 may have less amplitude in frequency components of second portion 408 than the measured vibration. A filter may be designed to adjust transformed position error data 404 to generate data with a similar amplitude profile in frequency space to measured vibration data. A filter associated with transformed position error data 404 suppresses frequency components associated with first portion 406 and increases amplitude of frequency components associated with second portion 408.

Figure 5A:
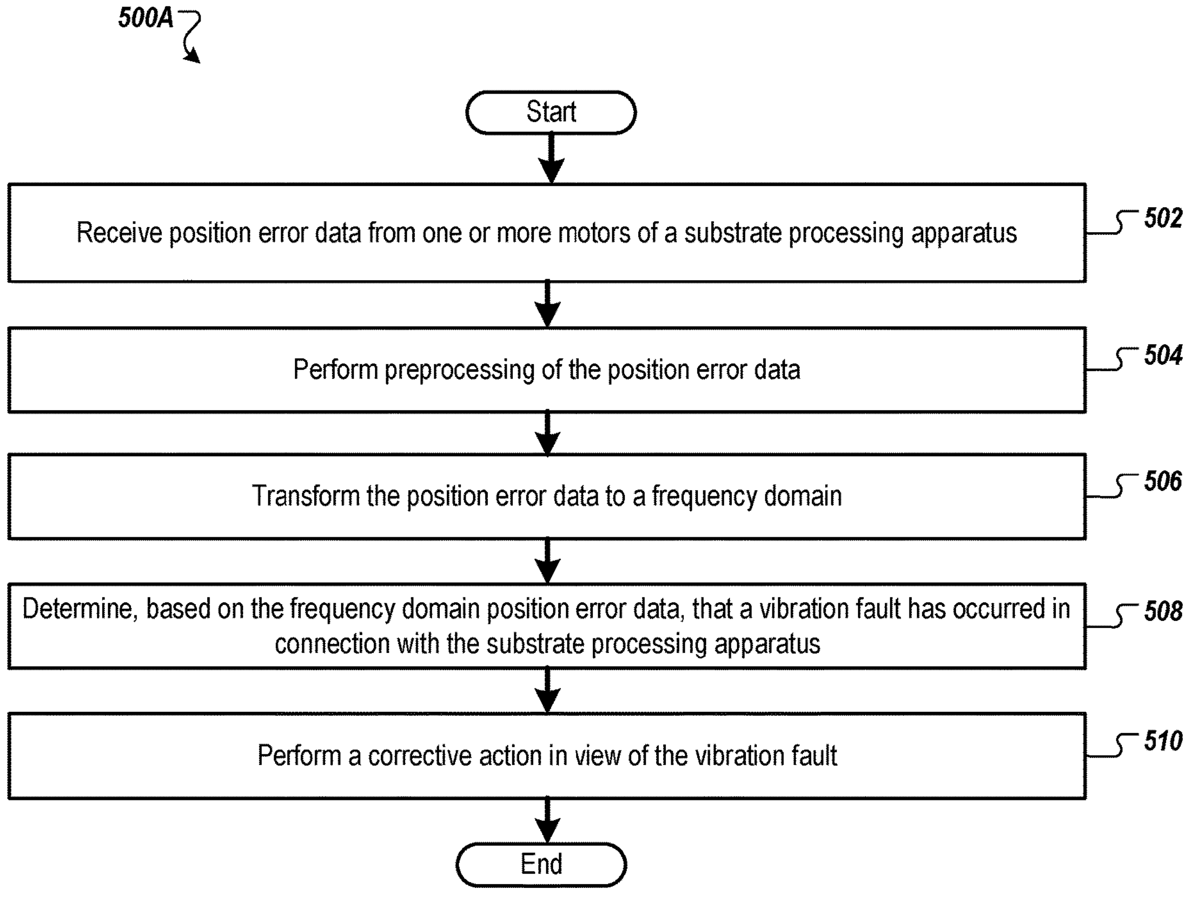
FIG. 5A is a flow diagram of a method for performing a corrective action in view of chamber vibration, according to some embodiments.

FIG. 5A is a flow diagram of a method 500A for performing a corrective action in view of chamber vibration, according to some embodiments. At block 502, processing logic receives position error data from one or more motors of a substrate processing system. The position error data may be from a chamber of a processing system. The position error data may be from a process chamber, metrology chamber, lithography chamber, etc. Motors may be associated with substrate supports, substrate stages, substrate transfer robots, etc. Motors may be linear motors. Motors may be of substrate stages in a metrology chamber. Motors may be of a substrate support in a metrology chamber configured to receive electromagnetic radiation from a substrate, such as optical radiation, infrared radiation, or the like. The one or more motors may be configured to adjust a position of a substrate, substrate support, substrate stage, or the like. The position error data may be collected during a processing operation. The position error data may be collected during a substrate measurement. The position error data may be collected during a substrate imaging operation. The position error data may be collected from a substrate disposed on a stage operatively coupled to the one or more motors.

At block 504, processing logic performs preprocessing of the position error data. Preprocessing may include adjusting position error data to improve vibration determination based on the position error data. Preprocessing may include weighting portions of the position error data differently, e.g., based on a prediction of reliability of the portions of the data in generating a determination regarding the chamber of the processing system vibration. Preprocessing may include weighting portions of the position error differently based on how indicative of vibration of the substrate processing apparatus the data is. Preprocessing may include excluding portions of the position error data.

Preprocessing may include excluding portions of the position error data that may be less reliable due to motor motion. Preprocessing may include receiving position reference data, e.g., target motor position data. Preprocessing may include determining one or more temporal windows for data weighting, data exclusion, or the like, based on position reference data. Temporal windows of position error data may include windows while a motor is moving, which may be determined based on the position reference data. A temporal window may include time when a motor of the chamber of a processing system is driven, e.g., caused to operate, caused to move, or the like. Temporal windows may include windows after a motor is intended to be moving, e.g., to account for settle of the motor. Temporal windows may include windows before a motor is intended to be moving, e.g., to account for timing mismatch.

At block 506, processing logic transforms the position error data to a frequency domain. The transformation may include one or more Fourier transform operations. The transformation may include performing one or more Fourier transform algorithms. The transformation may generate data that depicts a frequency distribution of oscillations included in the position error data.

At block 508, processing logic determines, based on the frequency domain position error data, that a vibration fault has occurred in connection with the substrate processing apparatus. The vibration fault may be in connection with a chamber of the substrate processing apparatus. The vibration fault may be in connection with a chamber of a substrate processing system. Determining that a vibration fault has occurred may include comparing one or more amplitudes of frequency domain position error data to threshold condition values. Determining that a vibration fault has occurred may include determining whether one or more amplitudes of oscillation in position error data satisfy threshold conditions. Determining that a vibration fault has occurred may include determining whether a cumulative vibration satisfies a threshold condition, e.g., whether the area under a curve of vibration magnitude in frequency space between two target frequency values satisfies a threshold condition.

At block 510, processing logic performs a corrective action in view of the vibration fault. The corrective action may include providing an alert to a user. The corrective action may include flagging a measurement, e.g., as unreliable. The corrective action may include repeating a measurement. The corrective action may include adjusting operation of a mechanical component of a substrate processing system, e.g., to reduce chamber vibration during one or more process operations. The corrective action may include recommending maintenance, e.g., based on a vibration indicative of failure or aging of a mechanical component of a process tool.

Figure 5B:
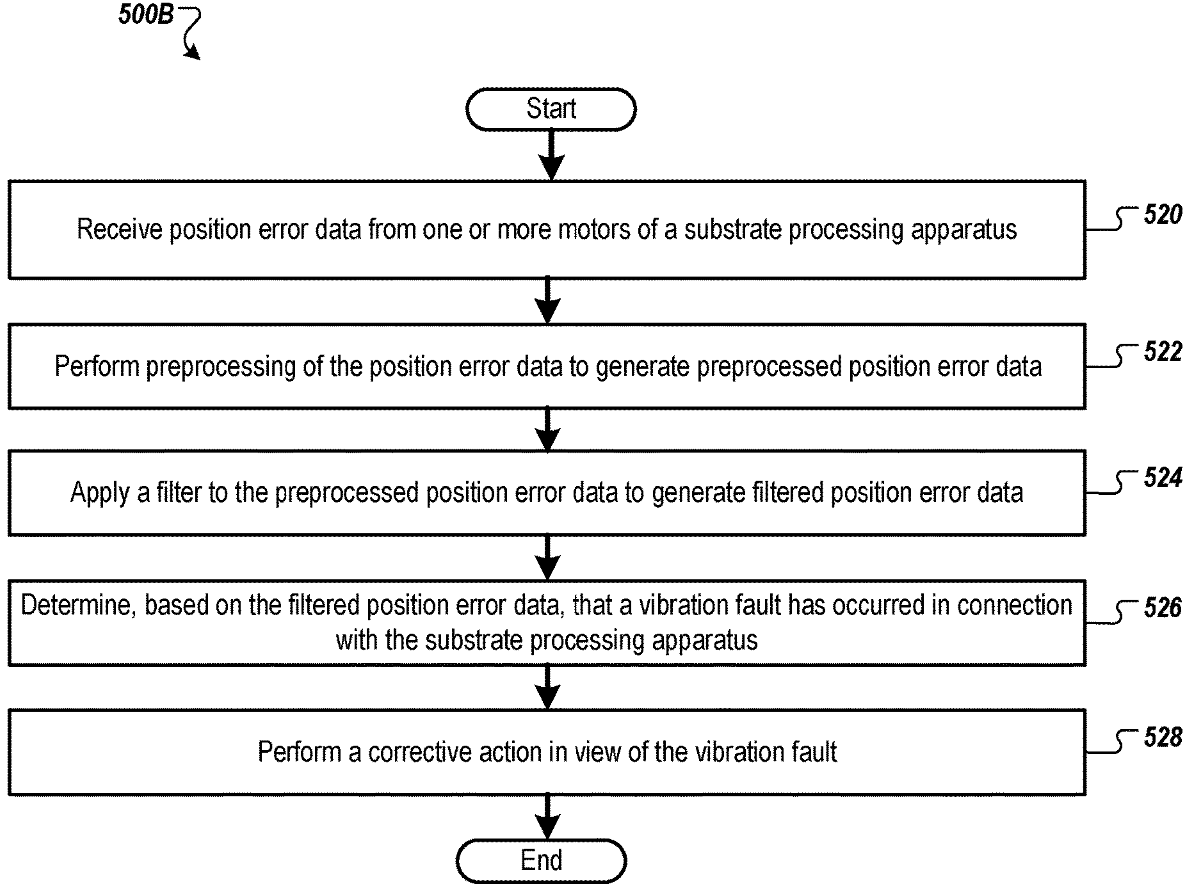
FIG. 5B is a flow diagram of a method for determining a vibration fault and performing a corrective action, according to some embodiments.

FIG. 5B is a flow diagram of a method 500B for determining a vibration fault and performing a corrective action, according to some embodiments. Operations of method 500B may share one or more features with operations of method 500A of FIG. 5A. At block 520, processing logic receives position error data from one or more motors of a substrate processing apparatus. Operations of block 520 may share one or more features with operations of block 502 of FIG. 5A. At block 522, processing logic performs preprocessing of the position error data to generate preprocessed position error data. Operations of block 522 may share one or more features with operations of block 504.

At block 524, processing logic applies a filter to the preprocessed position error data to generate filtered position error data. The filter may act to adjust the position error data to be more indicative of chamber vibration. The filter may be applied to time domain data. The filter may adjust an amplitude of frequencies of vibration represented in the position error data to generate data that more closely resembles vibration of a processing chamber. The filter may adjust the position error data to generate data that is more reliably indicative of a vibration fault. The filter may receive a time domain position error signal as input, and generate a time domain output indicative of chamber vibration.

At block 526, processing logic determines, based on the filtered position error data, that a vibration fault has occurred in connection with the substrate processing apparatus. Operations of block 526 may share one or more features with operations of block 508. For example, the fault determination may include comparing amplitudes of vibration to threshold conditions. A fault determination may be made if an amplitude of a time domain signal satisfies a threshold condition, such as a threshold distance of vibrational motion (e.g., in nm). A fault determination may be made if an amplitude of one or more frequency components of a vibration meets or exceeds a threshold value. Fault determination may be made in the time domain and/or the frequency domain. At block 528, processing logic performs a corrective action in view of the vibration fault. Operations of block 5258 may share one or more features with operations of block 510.

Figure 6:
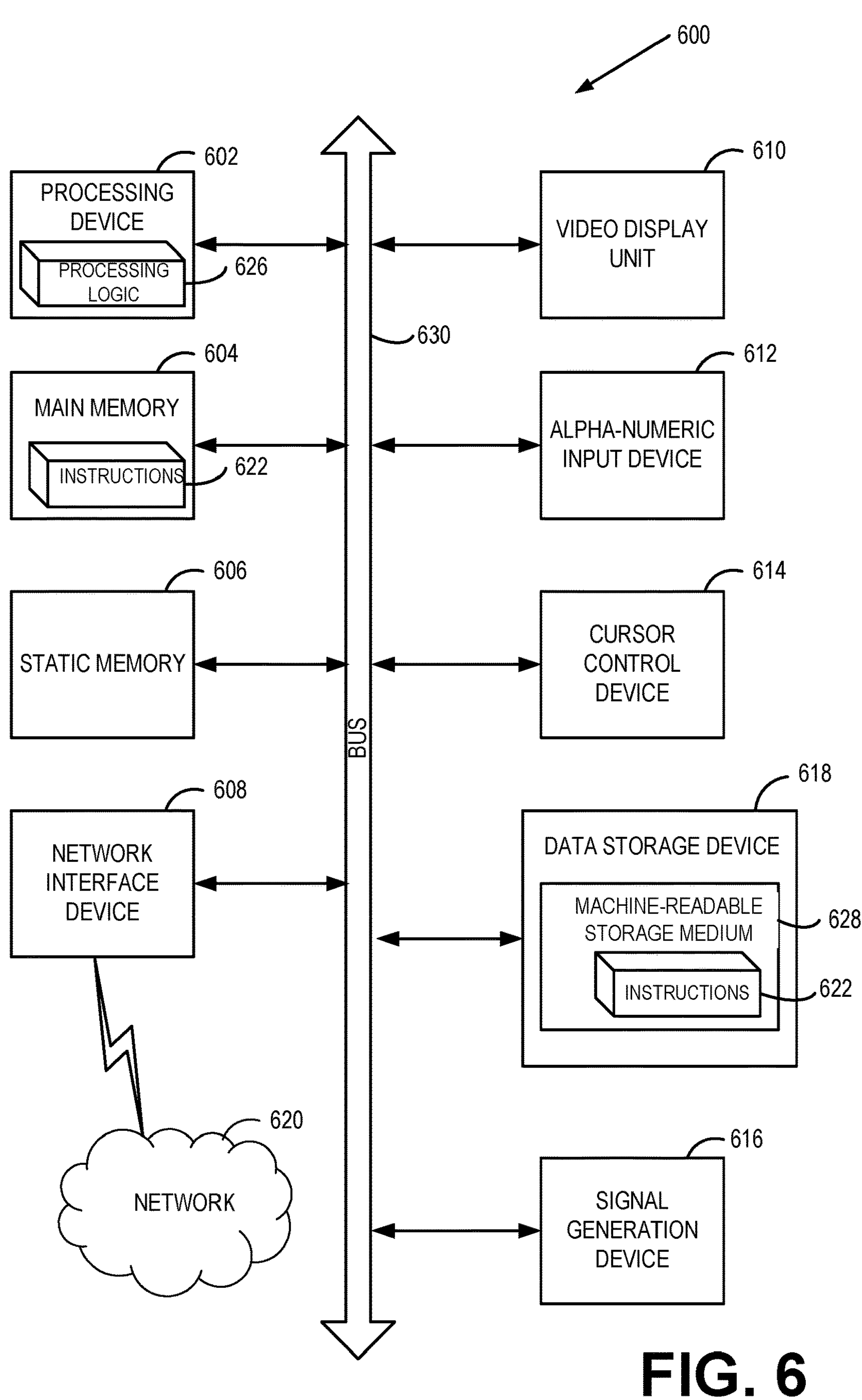
FIG. 6 depicts a block diagram of an example computing device, according to some embodiments.

FIG. 6 depicts a block diagram of an example computing device 600, operating in accordance with one or more aspects of the present disclosure. In various illustrative examples, various components of the computing device 600 may represent various components of the controller 109, of FIG. 1, or another computing device configured to perform vibration determination, perform and/or recommend corrective actions based on vibration determination, etc.

Example computing device 600 may be connected to other computer devices in a LAN, an intranet, an extranet, and/or the Internet. Computing device 600 may operate in the capacity of a server in a client-server network environment. Computing device 600 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 600 may include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 may be configured to execute instructions implementing methods 500A-B of FIGS. 5A-B. Processing device may include processing logic 626.

Example computing device 600 may further comprise a network interface device 608, which may be communicatively coupled to a network 620. Example computing device 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 may include a computer-readable storage medium (or, more specifically, a non-transitory machine-readable storage medium) 628 on which is stored one or more sets of executable instructions 622. In accordance with one or more aspects of the present disclosure, executable instructions 622 may comprise executable instructions associated with any of the methods disclosed herein, e.g., instructions for performing any methods disclosed herein. Instructions 622 may include instructions for determining vibration of a process tool. Instructions 622 may include instructions for recommending corrective actions based on vibration determination. Instructions 622 may include instructions for performing corrective cations based on vibration determination. Executable instruction 622 may be associated with executing methods illustrated in FIG. 5.

Executable instructions 622 may also reside, completely or at least partially, within main memory 604 and/or within processing device 602 during execution thereof by example computing device 600, main memory 604 and processing device 602 also constituting computer-readable storage media. Executable instructions 622 may further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," "receiving," "processing," "generating," "triggering," "training," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, compact disc read only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other type of machine-accessible storage media, or any type of media suitable for storing electronic instructions, each coupled to a computer system bus.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

receiving, by a processing device, position error data from one or more motors of a substrate support stage of a substrate processing apparatus;

performing preprocessing of the position error data to generate preprocessed position error data;

applying a filter to the preprocessed position error data to generate filtered position error data;

determining, based on the filtered position error data, that a vibration fault caused by a component external to the substrate support stage has occurred in connection with the substrate processing apparatus; and performing a corrective action in view of the vibration fault.

2. The method of claim 1, further comprising transforming the filtered position error data to a frequency domain to generate transformed position error data, wherein determining that a vibration fault has occurred is performed in view of the transformed position error data.

3. The method of claim 1, further comprising generating the filter comprises:

inducing vibration of one or more components of the substrate processing apparatus at a plurality of frequencies;

measuring the vibration of the one or more components of the substrate processing apparatus to generate measured vibration data;

receiving motor position error data indicative of the vibration; and designing the filter that, when applied to motor position error data, approximates the measured vibration data of the one or more components of the substrate processing apparatus at the plurality of frequencies.

4. The method of claim 1, wherein preprocessing of the position error data comprises:

receiving position reference data associated with the position error data;

separating the position error data into a first temporal window and a second temporal window based on the position reference data, wherein the one or more motors had operated within the first temporal window and had not operated within the second temporal window; and utilizing data of the second temporal window for further analysis, wherein the filtered position error data is based on the data of the second temporal window.

5. The method of claim 4, wherein the first temporal window comprises a third temporal window, during which the one or more motors are driven, and a fourth temporal window, occurring after the third temporal window, during which the one or more motors may settle.

6. The method of claim 1, wherein determining that a vibration fault has occurred comprises determining whether a vibration signal of the filtered position error data satisfies a threshold vibration condition.

7. The method of claim 1, wherein the position error data comprises data collected during a measurement operation of a substrate disposed upon the substrate support stage that is operatively coupled to the one or more motors.

8. The method of claim 1, wherein the corrective action comprises one or more of:

flagging a measurement;

repeating a measurement;

adjusting operation of a mechanical component of the substrate processing apparatus;

providing an alert to a user; or recommending maintenance.

9. A non-transitory machine-readable storage medium storing instructions which, when executed, cause a processing device to perform operations comprising:

receiving position error data from one or more motors of a substrate support stage of a substrate processing apparatus;

performing preprocessing of the position error data to generate preprocessed position error data;

applying a filter to the preprocessed position error data to generate filtered position error data;

determining, based on the filtered position error data, that a vibration fault caused by a component external to the substrate support stage has occurred in connection with the substrate processing apparatus; and performing a corrective action in view of the vibration fault.

10. The non-transitory machine-readable storage medium of claim 9, wherein the operations further comprise transforming the filtered position error data to a frequency domain to generate transformed position error data, wherein determining that a vibration fault has occurred is performed in view of the transformed position error data.

11. The non-transitory machine-readable storage medium of claim 9, wherein the operations further comprise:

inducing vibration of the substrate processing apparatus at a plurality of frequencies;

measuring the vibration of the substrate processing apparatus to generate measured vibration data;

receiving motor position error data indicative of the vibration; and designing the filter that, when applied to motor position error data, approximates the measured vibration data of the substrate processing apparatus at the plurality of frequencies.

12. The non-transitory machine-readable storage medium of claim 9, wherein preprocessing of the position error data comprises:

receiving position reference data associated with the position error data;

separating the position error data into a first temporal window and a second temporal window based on the position reference data, wherein the one or more motors had operated within the first temporal window and had not operated within the second temporal window; and utilizing data of the second temporal window for further analysis, wherein the filtered position error data is based on the data of the second temporal window.

13. The non-transitory machine-readable storage medium of claim 12, wherein the first temporal window comprises a third temporal window, during which the one or more motors are driven, and a fourth temporal window, occurring after the third temporal window, during which the one or more motors may settle.

14. The non-transitory machine-readable storage medium of claim 9, wherein the one or more motors comprise motors for adjusting a position of the substrate support stage.

15. The non-transitory machine-readable storage medium of claim 9, wherein the position error data comprises data collected during a measurement operation of a substrate disposed upon the substrate support stage that is operatively coupled to the one or more motors.

16. The non-transitory machine-readable storage medium of claim 9, wherein the corrective action comprises one or more of:

flagging a measurement;

repeating a measurement;

adjusting operation of a mechanical component of the substrate processing apparatus;

providing an alert to a user; or recommending maintenance.

17. A system, comprising memory and a processing device coupled to the memory, wherein the processing device is configured to:

receive position error data from one or more motors of a substrate support stage of a substrate processing apparatus;

perform preprocessing of the position error data to generate preprocessed position error data;

apply a filter to the preprocessed position error data to generate filtered position error data;

determine, based on the filtered position error data, that a vibration fault caused by a component external to the substrate support stage has occurred in connection with the substrate processing apparatus; and perform a corrective action in view of the vibration fault.

18. The system of claim 17, wherein preprocessing of the position error data comprises:

receiving position reference data associated with the position error data;

separating the position error data into a first temporal window and a second temporal window based on the position reference data, wherein the one or more motors had operated within the first temporal window and had not operated within the second temporal window; and utilizing data of the second temporal window for further analysis, wherein the filtered position error data is based on the data of the second temporal window.

19. The system of claim 17, wherein the position error data comprises data collected during a measurement operation of a substrate disposed upon the substrate support stage that is operatively coupled to the one or more motors.

20. The system of claim 17, wherein the corrective action comprises one or more of:

flagging a measurement;

repeating a measurement;

adjusting operation of a mechanical component of the substrate processing apparatus;

providing an alert to a user; or recommending maintenance.

* * * * *